United States Patent
Meyer et al.

(10) Patent No.: US 11,440,382 B2
(45) Date of Patent: Sep. 13, 2022

(54) TRANSPARENT MULTILAYER STRUCTURE FOR THERMAL MANAGEMENT

(71) Applicant: Covestro Deutschland AG, Leverkusen (DE)

(72) Inventors: Alexander Meyer, Düsseldorf (DE); Rafael Oser, Krefeld (DE); Dirk Hinzmann, Pulheim (DE); Timo Kuhlmann, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 326 days.

(21) Appl. No.: 16/461,417

(22) PCT Filed: Nov. 16, 2017

(86) PCT No.: PCT/EP2017/079371
§ 371 (c)(1),
(2) Date: May 16, 2019

(87) PCT Pub. No.: WO2018/091556
PCT Pub. Date: May 24, 2018

(65) Prior Publication Data
US 2019/0344642 A1 Nov. 14, 2019

(30) Foreign Application Priority Data
Nov. 17, 2016 (EP) ..................................... 16199355

(51) Int. Cl.
*B60J 3/00* (2006.01)
*B32B 27/08* (2006.01)
(Continued)

(52) U.S. Cl.
CPC .............. *B60J 3/007* (2013.01); *B32B 7/027* (2019.01); *B32B 7/12* (2013.01); *B32B 27/08* (2013.01);
(Continued)

(58) Field of Classification Search
CPC .. B60J 3/007; B60J 1/00; B32B 7/027; B32B 7/12; B32B 27/08; B32B 27/20;
(Continued)

(56) References Cited

U.S. PATENT DOCUMENTS

| 4,101,513 A | 7/1978 | Fox et al. |
| 4,185,009 A | 1/1980 | Idel et al. |

(Continued)

FOREIGN PATENT DOCUMENTS

| DE | 1031512 B | 6/1958 |
| DE | 2500092 A1 | 7/1976 |

(Continued)

OTHER PUBLICATIONS

International Search Report for PCT/EP2017/079371 dated Jan. 18, 2018.
(Continued)

*Primary Examiner* — Catherine A. Simone
(74) *Attorney, Agent, or Firm* — Faegre Drinker Biddle & Reath LLP

(57) ABSTRACT

The invention relates to transparent multilayer structures and glazings or glazing elements comprising said multilayer structures, which are suitable for screening an indoor space from a radiation source, comprising, in this order a) optionally a protective layer a, b) a substrate layer based on a thermoplastic polymer, especially an aromatic polycarbonate, having a luminous transmittance in the range of 380 to 780 nm of at least 0.3%, determined at a layer thickness of 4 mm according to DIN ISO 13468-2:2006 (D65, 10°), and a TDS value of less than 40%, determined according to ISO 13837:2008 at a layer thickness of 4 mm, the substrate layer containing at least 0.001 wt. % of an IR absorber different from carbon black, c) if necessary, another layer c based on a thermoplastic polymer with a maximum thickness of 600

(Continued)

µm, d) at least one metal layer d, containing at least one element selected from the group including Ag, Al, Au, Pt, Fe, Cr, Sn, In, Ti, Pd, Nb, Cu, V or their alloys, the sum of thicknesses of all metal layers being 1 nm to not more than 30 nm, and e) optionally a protective layer e, at least 60% of the substrate layer b being covered by metal layer d, the layers following layer d, including the protective layer e, when added up, having a thickness of not more than 100 nm and the metal layer being applied to the side of the substrate layer b designed to be on the face of the multilayer structure facing away from the radiation source.

15 Claims, 1 Drawing Sheet

(51) Int. Cl.
| | | |
|---|---|---|
| B32B 27/20 | (2006.01) | |
| B32B 27/36 | (2006.01) | |
| B32B 7/027 | (2019.01) | |
| B32B 7/12 | (2006.01) | |
| B60J 1/00 | (2006.01) | |

(52) U.S. Cl.
CPC ............ B32B 27/20 (2013.01); B32B 27/365 (2013.01); B60J 1/00 (2013.01); *B32B 2250/04* (2013.01); *B32B 2255/10* (2013.01); *B32B 2255/205* (2013.01); *B32B 2255/26* (2013.01); *B32B 2264/10* (2013.01); *B32B 2307/30* (2013.01); *B32B 2307/412* (2013.01); *B32B 2605/006* (2013.01); *B60J 1/002* (2013.01)

(58) Field of Classification Search
CPC .............. B32B 27/365; B32B 2250/04; B32B 2255/10; B32B 2255/205; B32B 2255/26; B32B 2264/10; B32B 2307/30; B32B 2307/412; B32B 2605/006; B32B 15/00; B32B 15/08; B32B 15/082
See application file for complete search history.

(56) References Cited

U.S. PATENT DOCUMENTS

| | | | |
|---|---|---|---|
| 4,395,463 | A | 7/1983 | Kray |
| 5,041,313 | A | 8/1991 | Patel |
| 5,235,026 | A | 8/1993 | Wulff et al. |
| 5,288,778 | A | 2/1994 | Schmitter et al. |
| 5,367,044 | A | 11/1994 | Rosenquist |
| 5,391,795 | A | 2/1995 | Pickett |
| 5,821,380 | A | 10/1998 | Holderbaum et al. |
| 5,869,185 | A | 2/1999 | Bahr et al. |
| 5,883,165 | A | 3/1999 | Kröhnke et al. |
| 5,965,246 | A * | 10/1999 | Guiselin ............ C03C 17/3423 359/580 |
| 6,228,973 | B1 | 5/2001 | McCloskey et al. |
| 6,350,512 | B1 | 2/2002 | Hurley et al. |
| 6,586,556 | B2 | 7/2003 | Kratschmer et al. |
| 6,613,869 | B1 | 9/2003 | Horn et al. |
| 6,998,169 | B1 * | 2/2006 | Bravet ............ B29C 45/14811 428/215 |
| 7,074,351 | B2 | 7/2006 | Döbler et al. |
| 7,169,834 | B2 | 1/2007 | Döbler et al. |
| 7,425,358 | B2 | 9/2008 | Heuer et al. |
| 7,442,430 | B2 | 10/2008 | Buckel et al. |
| 7,547,755 | B2 | 6/2009 | Heuer |
| 8,168,110 | B2 | 5/2012 | Niebling et al. |
| 8,357,741 | B2 | 1/2013 | Meyer et al. |
| 8,378,021 | B2 | 2/2013 | Schultes et al. |
| 8,628,699 | B2 | 1/2014 | Meyer et al. |
| 8,641,784 | B2 | 2/2014 | Meyer et al. |
| 8,845,920 | B2 | 9/2014 | Meyer |
| 8,968,610 | B2 | 3/2015 | Meyer et al. |
| 9,029,440 | B2 | 5/2015 | Meyer et al. |
| 9,605,129 | B2 | 3/2017 | Meyer et al. |
| 2002/0037414 | A1 | 3/2002 | Cunningham |
| 2010/0021709 | A1 | 1/2010 | Niimi et al. |
| 2011/0028601 | A1* | 2/2011 | Nitta ................. C08J 3/226 523/351 |
| 2011/0151218 | A1* | 6/2011 | Meyer Zu Berstenhorst .............. C09D 7/48 428/213 |
| 2012/0100326 | A1 | 4/2012 | Sherman et al. |
| 2012/0157587 | A1* | 6/2012 | Meyer ................. C08K 5/0041 524/88 |
| 2013/0011662 | A1 | 1/2013 | Clamer et al. |
| 2015/0185382 | A1 | 7/2015 | Leyder et al. |

FOREIGN PATENT DOCUMENTS

| | | | |
|---|---|---|---|
| DE | 2804283 | A1 | 8/1978 |
| DE | 3121385 | A1 | 8/1982 |
| DE | 4240313 | A1 | 6/1994 |
| DE | 19943642 | A1 | 3/2001 |
| DE | 10006208 | A1 | 8/2001 |
| DE | 10022037 | A1 | 11/2001 |
| DE | 102004058083 | A1 | 6/2006 |
| DE | 69835072 | T2 | 1/2007 |
| DE | 102007046472 | A1 | 4/2009 |
| DE | 102007061052 | A1 | 6/2009 |
| DE | 102009013960 | A1 | 9/2010 |
| EP | 0464701 | A2 | 1/1992 |
| EP | 0500496 | A1 | 8/1992 |
| EP | 0517044 | A2 | 12/1992 |
| EP | 0570165 | A2 | 11/1993 |
| EP | 0839623 | A1 | 5/1998 |
| EP | 1308084 | A1 | 5/2003 |
| EP | 1506249 | A1 | 2/2005 |
| EP | 1559743 | A1 | 8/2005 |
| EP | 1582549 | A1 | 10/2005 |
| EP | 1642159 | A1 | 4/2006 |
| EP | 1865027 | A1 | 12/2007 |
| EP | 2302423 | A2 | 3/2011 |
| JP | 2005344006 | A | 12/2005 |
| WO | WO-9615102 | A2 | 5/1996 |
| WO | WO-0055656 | A1 | 9/2000 |
| WO | WO-2002026862 | A1 | 4/2002 |
| WO | WO-03095521 | A1 | 11/2003 |
| WO | WO-2005113639 | A1 | 12/2005 |
| WO | WO-2006108520 | A1 | 10/2006 |
| WO | WO-2008037364 | A1 | 4/2008 |
| WO | WO-2008071363 | A2 | 6/2008 |
| WO | WO-2008109072 | A1 | 9/2008 |
| WO | WO-2009085662 | A2 | 7/2009 |
| WO | WO-2011141365 | A1 | 11/2011 |
| WO | WO-2011141366 | A1 | 11/2011 |
| WO | WO-2011141368 | A1 | 11/2011 |
| WO | WO-2011141369 | A1 | 11/2011 |
| WO | WO-2011144429 | A1 | 11/2011 |
| WO | WO-2012080395 | A1 | 6/2012 |
| WO | WO-2012080397 | A2 | 6/2012 |
| WO | WO-2012080398 | A2 | 6/2012 |

OTHER PUBLICATIONS

Written Opinion of the International Searching Authority for PCT/EP2017/079371 dated Jan. 18, 2018.

\* cited by examiner

TRANSPARENT MULTILAYER STRUCTURE FOR THERMAL MANAGEMENT

CROSS-REFERENCE TO RELATED APPLICATIONS

This application is a national stage application (under 35 U.S.C. § 371) of PCT/EP2017/079371, filed Nov. 16, 2017, which claims benefit of European Application No. 16199355.5, filed Nov. 17, 2016, both of which are incorporated herein by reference in their entirety.

The invention relates to a transparent multilayer article suitable for shielding a three-dimensional volume from a radiation source, especially from IR radiation. The invention also relates to glazing and glazing elements, especially roof modules, comprising such a multilayer article.

BACKGROUND OF THE INVENTION

Component parts based on thermoplastic material for use in the automotive sector offer many advantages over conventional materials, such as glass for example. These include, for example, elevated fracture resistance and/or a weight saving, which in the case of automobiles allow greater occupant safety in road traffic accidents and lower fuel consumption. Finally, materials containing thermoplastic polymers allow substantially greater freedom in design on account of their easier formability. Polycarbonate in particular is a very attractive material in this context since it has high toughness and hence is particularly suitable for automobile applications.

Since polycarbonate is transparent to IR radiation, it is necessary to equip it with thermal protection. For example, a vehicle interior, for instance a motor vehicle interior, should not heat up in an unpleasant manner if polycarbonate is used for a roof module.

An IR absorber-containing pane heats up when irradiated with sunlight, and the stored heat is partly released again to the outside, but partly also into the interior of the vehicle or the building. This secondary heat transfer into the interior is critical because this heats up the interior in addition to the direct transmission of energy.

Polycarbonate can be modified in different ways with regard to the thermal protection effect.

For the purpose of heat management, polycarbonate, and also other thermoplastic materials, can be equipped with IR-reflecting additives in order both to reduce the heating of the molded article and the transmission of the thermal radiation. Systems of this kind are described, for example, in DE 102004058083 A1, WO 2011/144429 A1 or DE 102007061052 A1. However, the additives described therein cannot be incorporated, or at least not directly, into every thermoplastic material, for example into polycarbonate for instance. Moreover, solutions of this kind are always opaque and hence not usable for transparent glazing. There are no known IR-reflecting additives today that are suitable for transparent applications.

BRIEF SUMMARY OF THE INVENTION

It is also possible to use IR-absorbing additives, for example particular borides, in thermoplastic materials. Compositions of this kind very effectively block the corresponding thermal radiation from the sun. However, absorption of the IR radiation results in significant heating of the thermoplastic materials, such that the thermoplastic materials themselves can in turn release heat by convection, radiation or thermal conduction to the respective interior. A suitable system as described, for example, in US 2010/0021709 A1.

It is also known that the use of metal layers on transparent substrates, for example glass, can give IR-reflecting properties. These systems have been described for glass in particular, but can in principle be applied to thermoplastic materials, for example to polycarbonate. Constructions of this kind comprising IR-reflecting metal layers are described, for example, in US 2015/0185382 A1. There have also been descriptions of IR-reflecting metal layers applied to transparent polymeric substrate films in DE 102009013960 A1. In order to obtain maximum weathering stability, these films, in the motor vehicle or mobility sector, are arranged between two composite glass panes—frequently in combination with a further plastic. The metal systems are frequently applied atop a flexible polymer of one of the following types: polyester, polyimide, polyethylene, polypropylene, preferably polyethylene terephthalate. In the latter case, the construction composed of thin layers may be applied to the flexible PET substrate and then a glazing system can be formed by bonding the flexible polymer to one or more glass substrates, especially via intermediate films of polyvinyl butyral, PVB. This type of flexible substrate is generally produced with a thickness of 5 to 50 μm. Systems of this kind are also described, for example, in EP 0464701 A2. Alternatively, the metal layer or the specific metal layer construction may also be sputtered directly onto a glass layer and then cohesively bonded to a second pane, optionally with inclusion of further films such as PVB. Here too, there is thus high weathering stability. In the architectural sector, double or triple glazing is frequently employed. Between the glass panes there is a gas filling for insulation, for example a noble gas filling. Here too, it is possible to apply an IR reflection layer, i.e. a metal layer construction, to one of the inner panes, in order to reflect IR radiation. Constructions of this kind are described, for example, in US 2002/037414 A1.

System solutions for glass are not directly applicable to polycarbonate since the layer construction is unsuitable for polycarbonate owing to its distinctly lower barrier to oxygen and moisture by comparison with glass.

Metal layers or metal oxide layers disposed on thermoplastic materials such as polycarbonate are described in EP 1642159 A1. This is a specific sequence of zinc oxide layers on thermoplastic material. The zinc oxide layer is arranged toward the heat source. Although such multilayer articles have high IR reflectivity, they show inadequate optical properties, for example a metallic surface gloss which is undesirable for many applications, especially for glazing elements. EP 2302423 A2 also describes a construction in which a metal layer is disposed on the front side or top side of a polycarbonate substrate, i.e. toward the heat source, in order to protect the polycarbonate and the interior behind it from introduction of heat. However, there is likewise a metallic surface impression here. Moreover, weathering stability in the case of this construction is not assured.

In order to protect the polycarbonate layer from heating, the metal layer, according to prior art, must also necessarily be applied atop the substrate, i.e. on the front side. However, the metal layer would thus be exposed to weathering, and so it would be necessary for the purpose in turn to develop particular sandwich systems or paint systems. A paint system developed according to the prior art for polycarbonate is unsuitable at least for such metal surfaces. There is currently no solution for assuring long-term weathering stability of such systems.

Motor vehicle exterior parts used in motor vehicle, rail vehicle and aircraft sectors or in the infrastructure sector should additionally ideally have a long service life and not undergo embrittlement during said service life, i.e. they should have maximum weathering stability. Color and surface (gloss effect) too should change only to a minimum degree. The thermoplastic parts should also ideally exhibit sufficient scratch resistance.

Since the moldings, especially glazing elements, may be relatively large and may have a complex geometry for the infrastructure or transport sector, the thermoplastic material should have sufficient flowability to be processible to give corresponding molded articles by the injection molding processes, for example especially the injection-compression molding process.

The problem addressed was therefore that of providing a multilayer article which is transparent, and hence suitable for glazing elements, based on thermoplastic polymer, especially aromatic polycarbonate, by means of which (solar) radiation-related heating of vehicle interiors is perceptibly reduced, or which is suitable for protecting a different three-dimensional volume from the radiation-related heating, i.e. which shields a three-dimensional volume from IR radiation or protects it from introduction of heat. This multilayer article was not to show any metallic "mirror effect" perceptible from the outside.

At the same time, an essential aspect of the invention is very economically competitive provision of glazing elements having the desired properties.

It has been found that, surprisingly, a multilayer article in which the metal layer is disposed behind a specific polycarbonate substrate can distinctly reduce the heating of the interior even though the system is transparent. The person skilled in the art would actually have expected this arrangement not to be able to solve the stated problem.

DETAILED DESCRIPTION OF THE INVENTION

The invention therefore provides a transparent multilayer article suitable for shielding a three-dimensional volume from a radiation source, comprising, in this sequence.
  a) optionally a protective layer a,
  b) a substrate layer b based on a thermoplastic polymer, especially aromatic polycarbonate, having
    light transmittance in the range from 380 to 780 nm of at least 3.0% determined at a layer thickness of 4 mm to DIN ISO 13468-2:2006 (D65, 10°) and
    a $T_{DS}$ value of less than 40%, determined to ISO 13837:2008 at a layer thickness of 4 mm,
    where the substrate layer contains at least 0.001% by weight of an IR absorber other than carbon black,
  c) optionally a further layer c based on a thermoplastic polymer having a maximum thickness of 600 µm,
  d) at least one metal layer d comprising at least one element selected from Ag, Al, Au, Pt, Fe, Cr, Sn, In, Ti, Pd, Nb, Cu, V or alloys thereof where the sum total of the thicknesses of all metal layers is 1 nm to a maximum of 30 nm, and
  e) optionally a protective layer e,
    wherein at least 60% of the substrate layer b is covered by metal layer d, the layers that follow on from layer d, including protective layer e, have a total thickness of not more than 100 nm
    and the metal layer is disposed on the side of the substrate layer b intended to lie on the side of the multilayer article facing away from the radiation source.

The invention further relates to the production and use of the multilayer articles of the invention and the products produced therefrom.

The multilayer articles of the invention are especially suitable for infrastructure and mobility applications, for example for bodywork components of both land and water vehicles and aircraft, and can especially be used for solar heat management as glazing element, for example glazing in the automotive and/or architectural sector. The invention therefore also provides corresponding bodywork components. It is a feature of the bodywork components of the invention that they protect the respective interior, for example a passenger cell, from heating by insolation.

The multilayer articles of the invention can be used wherever protection from thermal radiation, especially protection from solar thermal radiation, is of concern, but also in occupational protection, where protection from industrially produced heat sources is of concern.

The invention therefore especially relates to the use of the multilayer articles of the invention for production of roof modules, sunroofs, side and rear glazing, windows, especially for use in buildings, motor vehicles and rail vehicles, and these articles themselves that comprise the multilayer articles of the invention. These are preferably roof modules comprising the multilayer articles of the invention.

In the context of the present invention preferred embodiments recited for individual features may also be combined with one another provided they are not contradictory.

In a preferred embodiment, the multilayer article of the invention does not comprise any further layers between layers b to d except for adhesive layers and/or optionally (semi)metal nitride layers and/or (semi)metal oxide layers any further layers.

In a particularly preferred embodiment, the multilayer article of the invention does not comprise any further layers between layers b to d except for adhesive layers.

The multilayer article of the invention may alternatively be equipped with further protective and/or bonding layers. In addition to the metal layer d, for protection from oxidation, further (semi)metal-containing layers may be present as well as a pure metal layer. However, the basic sequence of the inventive construction is characterized in that the metal layer is behind the polycarbonate substrate—i.e. on the side remote from the sun. The thermoplastic polymer, especially based on polycarbonate, in the form of the substrate layer preferably bears a protective layer, especially a scratch-resistant coating, where the protective layer faces the heat source.

Further preferably, a multilayer article of the invention, aside from layers a to e, does not have any further layers apart from protective layers, also including, more preferably exclusively comprising, (semi)metal nitride layers and/or (semi)metal oxide layers and/or adhesive layers for bonding of the individual layers.

A transparent multilayer article preferred in accordance with the invention has the following layers:
  Layer a) a scratch-resistant coating based on polysiloxane, preferably containing organosilicon compounds having the formula $R_nSiX_{4-n}$ and/or partial condensates thereof,
    where the R radicals are the same or different and are a linear or branched, saturated or mono- or polyunsaturated or aromatic hydrocarbyl radical, the X radicals are the same or different and are hydrolyzable groups or hydroxyl groups, preferably halogen, especially chlorine or bromine, alkoxy groups, alkylcarbonyl groups or acyloxy groups, and n is 0, 1, 2 or 3, preferably 1 or 2, most preferably 1, and optionally a primer layer which is disposed atop the substrate layer b and acts as an adhesion promoter between the scratch-resistant coating based on polysiloxane and the substrate layer b, Layer b) a substrate layer b based on aromatic polycarbonate, having light transmittance in the range from 380 to 780 nm of at least 3.0% determined at a layer thickness of 4 mm to DIN ISO 13468-2:2006 (D65, 10°) and a $T_{DS}$ value of less than 40%, determined to ISO 13837:2008 at a layer thickness of 4 mm, where the substrate layer contains at least 0.001% by weight of an IR absorber other than carbon black, Layer d) at least one metal layer d comprising at least one element selected from Ag, Al, Au, Cu or alloys thereof, preferably silver, where the sum total of the thicknesses of all metal layers is 5 nm to 20 nm. Further preferably, the metal layer is a silver layer.

More preferably, this multilayer article does not comprise any further layers.

Alternatively, more preferably, the transparent multilayer article of the invention comprises the following layers in this sequence;

Layer a) a scratch-resistant coating based on polysiloxane, preferably containing organosilicon compounds having the formula $R_nSiX_{4-n}$ and/or partial condensates thereof, where the R radicals are the same or different and are a linear or branched, saturated or mono- or polyunsaturated or aromatic hydrocarbyl radical, the X radicals are the same or different and are hydrolyzable groups or hydroxyl groups, preferably halogen, especially chlorine or bromine, alkoxy groups, alkylcarbonyl groups or acyloxy groups, and n is 0, 1, 2 or 3, preferably 1 or 2, most preferably 1, and optionally a primer layer which is disposed atop the substrate layer b and acts as an adhesion promoter between the scratch-resistant coating based on polysiloxane and the substrate layer b, Layer b) a substrate layer b based on aromatic polycarbonate, having light transmittance in the range from 380 to 780 nm of at least 3.0% determined at a layer thickness of 4 mm to DIN ISO 13468-2:2006 (D65, 10°) and a $T_{DS}$ value of less than 40%, determined to ISO 13837:2008 at a layer thickness of 4 mm, where the substrate layer contains at least 0.001% by weight of an IR absorber other than carbon black, Layer d) a metal layer system consisting of
i) one or more metal layers, especially one metal layer, selected from the group of the Ag, Au and Cu layers and mixtures thereof, where the sum total of the thicknesses of the metal layers is 5 to 20 nm, and
ii) optically active antireflection layers of (semi)metal oxide and/or (semi)metal nitride applied to either side of the metal layer(s), the thickness of each of which is 5 to 80 nm. Most preferably, the metal layer is a silver layer.

More preferably, this multilayer article does not comprise any further layers.

Alternatively, more preferably, the transparent multilayer article of the invention comprises the following layers in this sequence:

Layer a) a scratch-resistant coating based on polysiloxane, preferably containing organosilicon compounds having the formula $R_nSiX_{4-n}$ and/or partial condensates thereof, where the R radicals are the same or different and are a linear or branched, saturated or mono- or polyunsaturated or aromatic hydrocarbyl radical, the X radicals are the same or different and are hydrolyzable groups or hydroxyl groups, preferably halogen, especially chlorine or bromine, alkoxy groups, alkylcarbonyl groups or acyloxy groups, and n is 0, 1, 2 or 3, preferably 1 or 2, most preferably 1, and optionally a primer layer which is disposed atop the substrate layer b and acts as an adhesion promoter between the scratch-resistant coating based on polysiloxane and the substrate layer b, Layer b) a substrate layer b based on aromatic polycarbonate, having light transmittance in the range from 380 to 780 nm of at least 3.0% determined at a layer thickness of 4 mm to DIN ISO 13468-2:2006 (D65, 10°) and a $T_{DS}$ value of less than 40%, determined to ISO 13837:2008 at a layer thickness of 4 mm, where the substrate layer contains at least 0.001% by weight of an IR absorber other than carbon black, an adhesive layer, Layer c) a layer c based on a thermoplastic polymer, preferably based on a polyester or based on aromatic polycarbonate, preferably based on a polyester, having a maximum thickness of 600 µm, especially up to 200 µm, Layer d) a metal layer system consisting of
i) one or more metal layers, especially one metal layer, selected from the group of the Ag, Au and Cu layers and mixtures thereof, where the sum total of the thicknesses of the metal layers is 5 to 20 nm, preferably consisting of a silver layer having a thickness of 5 to 20 nm, and
ii) optically active antireflection layers of (semi)metal oxide and/or semimetal nitride applied to either side of the metal layer(s), the thickness of each of which is 5 to 80 nm.

This multilayer article preferably does not have any further layers either.

In each of these embodiments specified as preferred/particularly preferred, what is called a black edge applied by means of two-component injection molding may be part of the multilayer article.

Preferably, the substrate layer b, in these embodiments specified as preferred/particularly preferred, contains 0.0001% by weight to 0.003% by weight, even further preferably to 0.0025% by weight, especially to 0.002% by weight, of carbon black and 0.00150% by weight to 0.01500% by weight, preferably 0.00180% by weight to 0.01100% by weight and even further preferably 0.00200% by weight to 0.009% by weight, more preferably 0.003% by weight to 0.00900% by weight, even more preferably 0.00400% by weight to 0.00800% by weight, exceptionally preferably 0.00450% by weight to 0.00750% by weight, calculated as solids content of boride in the overall polymer composition, of IR absorbers other than carbon black, especially boride, exceptionally preferably lanthanum hexaboride, alone or in a mixture, especially alone.

The invention more preferably provides glazing or a grazing element comprising such a multilayer article.

According to the invention, "radiation source" is understood to mean any source of radiation that leads to relevant heating, i.e. heating by at least 5° C., three-dimensional volumes, i.e. especially the sun, the IR radiation from which hits vehicles or buildings, for example, or a heat source, i.e. an IR source, that requires shielding for occupational reasons. In the case of a bodywork component, for example, comprising a multilayer article of the invention, the side of the multilayer article "facing the radiation source" is the side that faces outward, and the radiation source is the sun. The human body for instance, which releases body heat, or mobile phones for example, which also release heat, are not considered to be radiation sources in the context of the invention.

"Bodywork components" form the outer skin of vehicles. The term "vehicle" here should be regarded as an umbrella term for all modes of transport for goods, tools and passengers. It includes land vehicles, for instance motor vehicles and rail vehicles, water vehicles, especially ships, and aircraft, especially aeroplanes.

What is meant by "suitable for shielding a three-dimensional volume from a radiation source" is partial or complete prevention of the passage of the IR radiation emitted by the radiation source by the multilayer article into the three-dimensional volume behind the multilayer article, such that heating of the three-dimensional volume is distinctly reduced compared to no shielding.

"Transparent" in the context of the present invention is understood to mean multilayer articles having a light transmittance in the VIS region of the spectrum (380 to 780 nm) of more than 3% (transmittance $T_{VIS}$), determined to DIN ISO 13468-2:2006 (D65, 10°, layer thickness of the specimen plaque: 4 mm), and preferably a haze of less than 10%, determined to ASTM D1003:2013, based on the respective multilayer article. What are meant thereby are more particularly multilayer articles that show visual transparency, i.e. show the background and hence can be used as sunroof, for example.

The multilayer article may be equipped with further protective and/or bonding layers. Adjoining the metal layer, for protection from oxidation, as well as a pure metal layer, there may be further (semi)metal-containing layers, especially those composed of (semi)metal oxides and/or (semi) metal nitrides. However, the basic sequence of the inventive construction is characterized in that the metal layer is behind the polycarbonate substrate—i.e. on the side remote from the heat source. The polycarbonate in the form of the substrate layer preferably bears a protective layer, where the protective layer faces the heat source.

There follows a detailed description of the individual layers of the multilayer article of the invention:

Protective Layer a

Protective layer a preferably comprises a scratch-resistant lacquer (hard-coat). This is preferably a polysiloxane lacquer produced by the sol-gel process. Protective layer a more preferably also contains at least one UV absorber. Protective layer a has high abrasion and scratch resistance and hence especially fulfills the function of a scratch-resistant coating.

Commercially available systems are, for example, AS4000, SHC5020 and AS4700 from Momentive Performance Materials. Such systems are described, for example, in U.S. Pat. No. 5,041,313 A, DE 3,1213,85 A1, U.S. Pat. No. 5,391,795 A and WO 2008/109072 A1. These materials are typically synthesized via condensation of alkoxy- and/or alkylalkoxysilanes under acid or base catalysis. Nanoparticles can optionally be incorporated. Preferred solvents are alcohols such as butanol, isopropanol, methanol, ethanol and mixtures of these.

Various methods for producing a scratch-resistant coating on plastics articles are known. The scratch-resistant coatings may be applied, for example, via dipping methods, spin-coating, spraying methods or flow-coating, preferably via dipping or flow methods. Curing may be thermal or by means of UV irradiation. The scratch-resistant coating may be applied, for example, directly or after preparation of the substrate surface with a primer. A scratch-resistant coating may also be applied via plasma-assisted polymerization methods, for example via an $SiO_2$ plasma. Antifogging or antireflection coatings may likewise be produced via plasma methods. It is also possible to use certain injection molding processes, for example overmolding of surface-treated films, to apply a scratch resistant coating on the resulting molded article. The scratch-resistant layer may include various additives, for example UV absorbers derived from triazoles or from triazines, for example.

Protective layer a may be single- or multilayer system and hence also a combination of two or more layers a', a" etc. More particularly, protective layer a may consist of the layers topcoat layer a' and primer layer a", with the primer layer arranged between the topcoat layer and substrate layer b.

Polysiloxane-based scratch-resistant coatings are preferably applied via dipping or flow methods. Curing is effected at temperatures of 50° C.-140° C.

Preference is given to using a UV absorber-containing primer in order to improve the adhesion of the scratch-resistant lacquer on the substrate layer b. The primer may comprise further stabilizers, for example HALS systems (stabilizers based on sterically hindered amines), adhesion promoters and/or flow enhancers. The respective resin forming the base material of the primer layer may be selected from a multitude of materials and is described, for example, in Ullmann's Encyclopedia of Industrial Chemistry, $5^{th}$ Edition, Vol. A18, pp. 368-426, VCH, Weinheim 1991. It is possible to use polyacrylates, polyurethanes, phenol-based systems, melamine-based systems, epoxy systems and alkyd systems, and mixtures of these systems. The resin is usually dissolved in suitable solvents—often in alcohols. Depending on the resin chosen, hardening can be effected at room temperature or at elevated temperatures. Preference is given to using temperatures between 50° C. and 140° C.—frequently after a majority of the solvent has been removed within a short period at room temperature. Examples of commercially available primer systems include SHP470, SHP470-FT2050 and SHP401 from Momentive Performance Materials. Such coatings are described, for example, in U.S. Pat. No. 6,350,512 B1, U.S. Pat. No. 5,869,185 A, EP 1308084 A1 and WO 2006/108520 A1.

In a preferred embodiment which achieves particularly good weathering stability, protective layer a comprises a
   polysiloxane-based scratch resistant coating (layer a') containing
   i. at least one UV absorber from the group of benzophenones, resorcinols, 2-(2-hydroxyphenyl)benzotriazoles, hydroxyphenyl-s-triazines, 2-cyanoacrylates, oxalanilides
     and/or a UV inhibitor from the group of sterically hindered amines (HALS), in particular based on 2,2,6,6-tetramethylpiperidine or derivatives thereof;

ii. at least one combination of an organomodified silane with a silica sol. The organomodified silane is, for example, a methyltrialkoxy- or dimethyldialkoxysilane;

and optionally, in a further-preferred embodiment, additionally a primer layer (layer a") disposed atop the substrate layer b and acting as adhesion promoter between the polysiloxane-based scratch-resistant coating and the substrate layer b, comprising at least one UV absorber from the group of benzophenones, resorcinols, 2-(2-hydroxyphenyl)benzotriazoles, hydroxyphenyl-s-triazines, 2-cyanoacrylates, oxalanilides and/or sterically hindered amines (HALS), especially based on 2,2,6,6-tetramethylpiperidine and derivatives thereof, wherein the thickness of the primer layer is 0.3 µm to 8 µm, preferably 1.1 µm to 4.0 µm.

Most preferably, protective layer a does not comprise any further layers.

According to the invention, "derivatives" are understood to mean those compounds having a molecular structure that has, in place of a hydrogen atom or a functional group, a different atom or a different group of atoms or in which one or more atoms/groups of atoms has/have been removed. The parent compound thus still remains recognizable.

The polysiloxane layer preferably contains organosilicon compounds having the formula $R_nSiX_{4-n}$ and/or partial condensates thereof, where the R radicals are the same or different and are a linear or branched, saturated or mono- or polyunsaturated or aromatic hydrocarbyl radical, the X radicals are the same or different and are hydrolyzable groups or hydroxyl groups, preferably halogen, especially chlorine or bromine, alkoxy groups, alkylcarbonyl groups or acyloxy groups, and n is 0, 1, 2 or 3, preferably 1 or 2, most preferably 1.

R preferably represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbons. The alkyl/alkenyl radicals more preferably have up to 12, yet more preferably up to 8, carbon atoms. More preferably, all radicals are methyl and/or phenyl.

More preferably, X is an alkoxy group, most preferably a $C_1$- to $C_4$-alkoxy group, for example a methoxy group or an ethoxy group.

The silicon compounds $R_nSiX_{4-n}$ are hydrolyzable and condensable via the X radicals. These hydrolytically condensable groups are used to construct an inorganic network comprising Si—O—Si units. In contrast to the X radicals, the R radicals are stable to hydrolysis under the typical condensation conditions.

When using the abovementioned siloxane systems, dry layer thicknesses of 3 µm-20 µm are preferred, further preferably 5 µm-15 µm, especially preferably 6 µm-12 µm. "Dry layer thickness" here means the layer thickness of the lacquer after application and subsequent evaporation of the solvent and subsequent thermal or UV curing.

Rather than primer/scratch resistant coating combinations, it is also possible to use one-component hybrid systems that are either thermally curable or UV-curable for the multilayer articles of the invention.

These are described, for example, in EP 0570165 A2 or WO 2008/071363 A2 or DE 2804283 A. Commercially available hybrid systems are obtainable, for example, under the PHC 587, PHC 587C names as thermally curable lacquers and under the UVHC 3000 and UVHC 5000 names as UV-curable lacquers from Momentive Performance Materials. Further commercially available UV-curing lacquer systems that are suitable in accordance with the invention are UVT 610 and UVT 820 from Redspot.

In a particularly preferred process for producing the multilayer articles of the invention, protective layer a is applied by means of the flow-coating process since it leads to coated parts having high optical quality.

The flow-coating process can be effected manually with a hose or suitable coating head or automatically in a continuous procedure by way of flow-coating robots and optionally slot dies.

Further possible methods of application are dipping, blade coating, rolling, spraying or spin-coating. The components may be coated here either while suspended or while mounted in an appropriate holder.

For larger and/or 3D components—i.e. components having a three-dimensional surface which thus have a geometry departing from that of a sheet—the component to be coated is suspended or mounted in a suitable holder.

In the case of small-scale components, the coating procedure can also be carried out manually. This is done by pouring the liquid primer or lacquer solution to be layered, for formation of protective layer e, across the sheet proceeding from the upper edge of the small part in longitudinal direction, while the starting point of the lacquer on the sheet was simultaneously guided from left to right across the width of the sheet. The lacquered sheets are aired and cured while suspended vertically in a clamp according to the respective manufacturer's instructions.

Substrate Layer b

The material of substrate layer b of the multilayer articles of the invention is preferably based on aromatic polycarbonate, where the material of the substrate layer has a light transmittance in the range from 300 to 780 nm of at least 3.0%, preferably more than 5%, determined at a layer thickness of 4 mm to DIN ISO 13468-2:2006 (D65, 10°), and a $T_{DS}$ value, determined to ISO 13837:2008 at a layer thickness of 4 mm, of less than 40%, preferably less than 30%, especially preferably less than 20% and most preferably less than 12%. The material of substrate layer b comprises at least one IR absorber other than carbon black.

Substrate layer b preferably has a thickness of 1.0 mm to 7.0 mm, further preferably of 2.0 mm to 6.0 mm, more preferably of 3.0 mm to 5.5 mm.

In principle, in place of polycarbonate, including copolycarbonate, it would also be possible to use other thermoplastic materials, for instance polyestercarbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), cyclic polyolefin, poly- or copolyacrylates and poly- or copolymethacrylate, for example poly- or copolymethylmethacrylate (such as PMMA), and also copolymers with styrene, for example transparent polystyrene-acrylonitrile (PSAN), thermoplastic polyurethanes, polymers based on cyclic olefins (e.g. TOPAS®, a commercial product from Ticona).

The IR absorber is soluble or insoluble in the composition based on aromatic polycarbonate or other thermoplastic polymer. When insoluble IR absorbers are used, it has to be ensured that the IR absorber can be introduced transparently into the polycarbonate matrix or other polymer matrix, but this is within the scope of common art knowledge. Preference is given to using IR absorbers as described in WO 2011/141365 A1, WO 2011/141366 A1, WO 2011/141369 A1 and WO 2012/080397 A2.

The material of the substrate layer contains at least one organic and/or inorganic IR absorber, preferably inorganic IR absorber, calculated as solids content of IR absorber in the overall polymer composition, which forms the material of substrate layer b. The solids content of IR absorber in this connection means the IR absorber as a pure substance and not a suspension or other formulation containing the pure substance.

Suitable IR absorbers are disclosed, for example, in EP 1 559 743 A1, EP 1 865 027 A1, DE 10022037 A1, DE 10006208 A1 and in Italian patent applications WO2011141369 A1, WO2011141368 A1 and WO2011141366 A1.

Suitable organic infrared absorbers are described in substance classes, for example, in M. Matsuoka, Infrared Absorbing Dyes, Plenum Press, New York, 1990. Particularly suitable infrared absorbers are those from the classes of the phthalocyanines, the naphthalocyanines, the metal complexes, the azo dyes, the anthraquinones, the squaric acid derivatives, the ammonium dyes, the perylenes, the quaterylenes and the polymethines. Among these, phthalocyanines, perylenes, quaterylenes and naphthalocyanines are very particularly suitable. The person skilled in the art knows which compounds from these compound classes are suitable as IR absorbers.

Suitable inorganic IR absorbers are nanoscale inorganic IR absorbers based on boride, preferably a metal boride, where the metal is selected from the group of the following elements: La, Ce, Pr, Nd, Tb, Dy, Ho, Y, Sm, Eu, Er, Tm, Yb, Lu, Sr, Ti, Zr, Hf, V, Ta, Cr, Mo, W and Ca. The hexaboride form is particularly preferred. Especially preferred are lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride ($CrB$ and $CrB_2$), molybdenum boride ($MoB_2$, $Mo_2B_5$ and $MoB$), tungsten boride ($W_2B_5$), or combinations of these borides. Very particular preference is given to borides based on lanthanum hexaboride ($LaB_6$) or mixtures comprising lanthanum hexaboride. Substrate layer b thus preferably contains lanthanum hexaboride as IR absorber.

If borides are used as IR absorber, these are preferably used in an amount of 0.00150% by weight to 0.01500% by weight, preferably 0.00180% by weight to 0.01100% by weight, even further preferably 0.00200% by weight to 0.009% by weight, more preferably 0.003% by weight to 0.00900% by weight, even more preferably 0.00400% by weight to 0.00800% by weight, exceptionally preferably 0.00450% by weight to 0.00750% by weight, calculated as solids content of boride in the overall polymer composition. In this connection, solids content of boride means that boride is used as pure substance and not a suspension or formulation containing the pure substance. Preferred materials for the substrate layer are especially those based on aromatic polycarbonates containing lanthanum hexaboride as IR absorber, more preferably in an amount of 0.001% by weight to 0.009% by weight.

In addition, it is possible to use tungsten compounds of the following type:

b1) $WyOz$ (W=tungsten, O=oxygen; z/y=2.20-2.99) and/or b2) $MxWyOz$ (M=at least one element selected from the group of H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0), where elements preferred as M are H, Cs, Rb, K, Tl, In, Ba, Li, Ca, Sr, Fe and Sn, among which very particular preference is given to Cs. Particular preference is given to optionally zinc-doped $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and mixtures thereof. In a particular embodiment of the present invention, very particular preference is given to the sole use of $Cs_{0.33}WO_3$, especially as zinc-doped $Zn_xCs_{0.33}WO_3$ (with x=0.001-0.015), as inorganic IR absorber, especially as the sole inorganic IR absorber. Likewise preferred are Cs/W ratios of 0.20 and 0.25.

If tungstates are used as IR absorbers, this is preferably done in an amount of 0.001% by weight-0.5% by weight and further preferably 0.002% by weight-0.100% by weight and more preferably 0.009% by weight-0.075, calculated as solids content of tungstate in the overall polymer composition. In this connection, solids content of tungstate means that the tungstate content is reported as pure substance and not that of a dispersion, suspension or other formulation containing the pure substance.

In addition, it is possible to add compounds such as indium oxide doped with 2 to 30 atom %, preferably with 4 to 12 atom %, of tin (ITO) or with 10 to 70 atom % of fluorine. Likewise suitable is tin oxide doped with 2 to 60 atom % of antimony (ATO) or with 10 to 70 atom % of fluorine. These IR absorbers are preferably used in amounts up to 0.5% by weight, preferably 0.038% to 0.500% by weight, further preferably 0.050% to 0.250% by weight, more preferably 0.063% to 0.150% by weight, based on the total weight of the polycarbonate composition of substrate layer b.

A further suitable IR absorber is zinc oxide doped with 1 to 30 atom %, preferably with 2 to 10 atom %, of aluminum or with 2 to 30 atom % of indium or with 2 to 30 atom % of gallium.

Among the IR absorbers mentioned in the cited literature, preference is given to those based on boride or tungstate, and also those based on ITO or ATO, and also combinations thereof.

The material of substrate layer b is a material based on a thermoplastic polymer, preferably based on aromatic polycarbonate. "Based on" here and elsewhere in the description of the present invention means that the overall composition described contains at least 50% by weight, preferably 70% by weight, more preferably 90% by weight, of the respective polymer.

Aromatic polycarbonates in the context of the invention are all known aromatic polycarbonates. This includes homopolycarbonates and copolycarbonates. Where reference is made merely to "polycarbonate" anywhere in the context of the present invention, what are meant are especially aromatic polycarbonates. Aromatic carbonates are particularly preferred as base material for substrate layer b.

Polycarbonates suitable in accordance with the invention preferably have average molecular weights $\overline{M}_w$ of 10 000 to 50 000 g/mol, further preferably of 14 000 to 40.000 g/mol and more preferably of 16 000 to 32 000 g/mol, determined by gel permeation chromatography according to DIN 55672-1:2007-08, calibrated against bisphenol A polycarbonate standards using dichloromethane as eluent. Calibration is effected with linear polycarbonates (formed from bisphenol A and phosgene) of known molar mass distribution from PSS Polymer Standards Service GmbH, Deutschland according to method 2301-0257502-09D (from 2009 in German language) from Currenta GmbH & Co. OHG, Leverkusen. The eluent is dichloromethane. Column combination of crosslinked styrene-divinylbenzene resins. Diameter of the analytical columns: 7.5 mm; length: 300 mm. Particle sizes of the column material: 3 µm to 20 µm. Concentration of the solutions: 0.2% by weight. Flow rate: 1.0 ml/min, temperature of solutions: 30° C. Detection using a refractive index (RI) detector.

The polycarbonates are preferably prepared by the interfacial process or the melt transesterification process, which have been described many times in the literature.

With regard to the interfacial process, reference is made by way of example to H. Schnell, "Chemistry and Physics of Polycarbonates", Polymer Reviews, vol. 9, Interscience Publishers, New York 1964 p. 33 ff., to Polymer Reviews, vol. 10, "Condensation Polymers by Interfacial and Solution Methods", Paul W. Morgan, Interscience Publishers, New York 1965, ch. VIII, p. 325, to Drs. U. Grigo, K. Kircher and P. R-Müller "Polycarbonate" [Polycarbonates] in Becker/Braun, Kunststoff-Handbuch [Polymer Handbook], volume 3/1, Polycarbonate, Polyacetale, Polyester, Celluloseester [Polycarbonates, Polyacetals, Polyesters, Cellulose Esters], Carl Hanser Publishers, Munich, Vienna, 1992, p. 118-145, and to EP 0 517 044 A1.

The melt transesterification process is described, for example, in the "Encyclopedia of Polymer Science", Vol. 10 (1969), Chemistry and Physics of Polycarbonates, Polymer Reviews, H. Schnell, Vol. 9, John Wiley and Sons, Inc. (1964), and in patent specifications DE 10 31 512 A and U.S. Pat. No. 6,228,973 B1.

The polycarbonates are preferably prepared by reactions of bisphenol compounds with carbonic acid compounds, especially phosgene, or of diphenyl carbonate or dimethyl carbonate in the melt transesterification process.

Particular preference is given here to homopolycarbonates based on bisphenol A and copolycarbonates based on the monomers bisphenol A and 1,1-bis(4-hydroxyphenyl)-3,3,5-trimethylcyclohexane.

These and further bisphenol/diol compounds that are usable for polycarbonate synthesis are described inter alia in WO 2008/037364 A1 (page 7, line 21 to page 10, line 5), EP 1 582 549 A1 ([0018] to [0034]), WO 2002/026862 A1 (page 2, line 20 to page 5, line 14) and WO 2005/113639 A1 (page 2, line 1 to page 7, line 20).

The polycarbonates may be linear or branched. It is also possible to use mixtures of branched and unbranched polycarbonates.

Suitable branching agents for the preparation of branched polycarbonates are known from the literature and described for example in the patent documents U.S. Pat. No. 4,185,009 B and DE 25 00 092 A1 (3,3-bis(4-hydroxyaryloxindoles), see whole document in each case), DE 42 40 313 A1 (see page 3, lines 33 to 55), DE 19 943 642 A1 (see page 5, lines 25 to 34) and U.S. Pat. No. 5,367,044 B and in literature cited therein.

The polycarbonates used may additionally also be intrinsically branched, and in that case no branching agent is added in the course of polycarbonate preparation. An example of intrinsic branching is that of so-called Fries structures, as described for melt polycarbonates in EP 1 506 249 A1.

In addition, chain terminators may be used in polycarbonate preparation. Chain terminators used are preferably phenols such as phenol, alkylphenols such as cresol and 4-tert-butylphenol, chlorophenol, bromophenol or cumylphenol or a mixture thereof.

The compositions that form substrate layer b and are based on aromatic polycarbonate preferably contain one or more further customary additives. These are customary additives described, for example, in EP 0 839 623 A1, WO 1996/15102 A2, EP-A 0 500 496 A1 or "Plastics Additives Handbook", Hans Zweifel, 5th Edition 2000, Hanser Verlag, Munich, for example mold release agents, UV absorbers, heat stabilizers, flame retardants, antistats, colorants and/or flow enhancers.

The compositions particularly preferably contain mold release agents based on a fatty acid ester, preferably based on a stearic ester, especially preferably based on pentaerythritol. In a particular embodiment, pentaerythritol tetrastearate (PETS) and/or glycerol monostearate (GMS) is used.

Optionally, the composition used for substrate layer b further comprises an ultraviolet absorber. Suitable UV absorbers are compounds having the lowest possible transmittance below 400 nm and the highest possible transmittance above 400 nm. Such compounds and the preparation thereof are known from the literature and are described, for example, in EP 0 839 623 A1, WO 1996/15102 A2 and EP 0 500 496 A1. Ultraviolet absorbers particularly suitable for use in the composition of the invention are benzotriazoles, triazines, benzophenones and/or arylated cyanoacrylates.

In a particularly preferred embodiment, the composition used for substrate layer b contains UV absorbers.

Examples of suitable ultraviolet absorbers are as follows: hydroxybenzotriazoles, such as 2-(3',5'-bis(1,1-dimethylbenzyl)-2'-hydroxyphenyl)benzotriazole (Tinuvin® 234, BASF AG, Ludwigshafen), 2-(2'-hydroxy-5'-(tert-octyl) phenyl)benzotriazole (Tinuvin® 329, BASF AG, Ludwigshafen), 2-(2'-hydroxy-3'-(2-butyl)-5'-(tert-butyl)phenyl)benzotriazole (Tinuvin® 350, BASF AG, Ludwigshafen), bis(3-(2H-benzotriazolyl)-2-hydroxy-5-tert-octyl)methane, (Tinuvin® 360, BASF AG, Ludwigshafen), (2-(4,6-diphenyl-1,3,5-triazin-2-yl)-5-(hexyloxy)phenol (Tinuvin® 1577, BASF AG, Ludwigshafen), the benzophenones 2,4-dihydroxybenzophenone (Chimasorb® 22, BASF AG, Ludwigshafen) or 2-hydroxy-4-(octyloxy)benzophenone (Chimassorb® 81, BASF AG, Ludwigshafen), 2-cyano-3,3-diphenyl-2-propenoic acid, 2,2-bis[[(2-cyano-1-oxo-3,3-diphenyl-2-propenyl)oxy] methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, BASF AG, Ludwigshafen) or tetraethyl 2,2'-(1,4-phenylenedimethylidene)bismalonate (Hostavin® B-Cap, Clariant AG). It is also possible to use mixtures of these ultraviolet absorbers.

In a preferred embodiment, the polymer composition further comprises at least one further thermal stabilizer or processing stabilizer.

Phosphites and phosphonites are preferentially suitable, as are phosphines. Examples include triphenyl phosphite, diphenyl alkyl phosphite, phenyl dialkyl phosphite, tris (nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl)-4,4'-biphenylenediphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenzo[d,g]-1,3,2-dioxaphosphocine, 2,2',2"-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane, bis(2,6-di-tert-butyl-4-methylphenyl)pentaerythritol diphosphite, triphenylphosphine (TPP), trialkylphenylphosphine, bisdiphenylphosphinoethane or a trinaphthylphosphine. Especially preferably, triphenylphosphine (TPP), Irgafos® 168 (tris(2,4-di-tert-butylphenyl) phosphite) or tris(nonylphenyl) phosphite or mixtures thereof are used. It is also possible to use alkyl phosphates, for example mono-, di- and trihexyl phosphate, triisoctyl phosphate and trinonylphosphate.

It is also possible to use phenolic antioxidants such as alkylated monophenols, alkylated thioalkylphenols, hydroquinones and alkylated hydroquinones. Particular preference is given to using Irganox® 1010 (pentaerythritol 3-(4-hydroxy-3,5-di-tert-butylphenyl)propionate; CAS: 6683-19-8) and/or Irganox 1076® (2,6-di-tert-butyl-4-(octadecanoxycarbonylethyl)phenol).

Suitable colorants are in particular anthraquinone-based, perinone-based, phthalocyanine-based colorants or colorants derived from these structures. Particularly preferred colorants are described in WO 2012/080395 A1. Colorants used may be Macrolex Violet 3R (CAS 61951-89-1; Solvent Violet 36), Macrolex Green 5B (CAS 128-80-3; Solvent Green 3; C.I. 61565), Amaplast Yellow GHS (CAS 13676-91-0; Solvent Yellow 163; C:I: 58840), Macrolex Orange 3G (CAS 6925-69-5; Solvent Orange 60; C.I. 564100), Macrolex Blue RR (CAS 32724-62-2; Solvent Blue 97; C.I. 615290); Keyplast Blue KR (CAS 116-75-6; Solvent Blue 104; C.I. 61568), Heliogen Blue types (e.g. Heliogen Blue K 6911; CAS 147-14-8; Pigment Blue 15:1; C.I. 74160), Heliogen Green types (for example Heliogen Green K 8730; CAS 1328-53-6; Pigment Green 7; C.I. 74260) and Macrolex Green G (CAS 28198-05-2; Solvent Green 28; C.I. 625580).

Preference is given to using no insoluble pigments since these lead to color streaks and/or elevated haze. Particular pigments such as the abovementioned phthalocyanines or Pigment Blue 60 are supplied in preparations or supply forms that enable transparent incorporation in certain concentrations.

Especially preferably, substrate materials based on polycarbonate contain, as colorants, anthraquinone dyes, phthalocyanine-based colorants and/or perinone dyes or a combination of perinone dyes, phthalocyanine dyes and/or anthraquinone dyes. Some compounds from these classes are simultaneously suitable as IR absorber. More preferably, polycarbonate-based compositions contain at least two structurally different colorants, for example two anthraquinone-based colorants of different structure or one perinone dye and one anthraquinone dye or one phthalocyanines dye and one anthraquinone dye. Especially preferably, the polycarbonate substrate contains 0.001-0.02% by weight of colorants (soluble colorants and pigments except the carbon black), based on the overall composition of the polycarbonate substrate. Very particularly preferred colorants are described, for example, in WO 2012/080398 A2, WO 2012/080397 A2 and WO 2012/080395 A1.

In addition, the polymer composition which is the material of substrate layer b may contain carbon black as inorganic nanoscale pigment. Carbon black is an inexpensive colorant with which frequently desired gray colors of the compositions can be achieved. If carbon black is used, it should be ensured that it is transparently miscible into the polycarbonate matrix. The carbon black is preferably finely dispersed in the organic polymer matrix and is preferably in nanoscale form. Preferably, the nanoscale carbon black is used in amounts of 0.0001% to 0.003% by weight, even further preferably to 0.0025% by weight, more preferably to 0.002% by weight, based on the overall composition of the polycarbonate substrate. Above the upper limit, transmittance in the visible region is no longer sufficient for transparent applications. Suitable carbon blacks have an average particle size of preferably less than 100 nm, further preferably less than 75 nm, even further preferably less than 50 nm and more preferably less than 40 nm, the average particle size preferably being greater than 0.5 nm, further preferably greater than 1 nm and more preferably greater than 5 nm, determined by means of scanning electron microscopy, especially to ASTM 3849-14.

Substrate materials having the abovementioned transmission data can be produced via a multitude of combinations of soluble colorants, pigments, nanoscale carbon black, and soluble and insoluble IR absorbers. The person skilled in the art is able to select from the abovementioned colorants, for example, and blend them in particular concentrations with IR absorbers and nanoscale carbon black such that the corresponding transmittance data are attained.

The compositions must be processable at the temperatures customary for thermoplastics, i.e. at temperatures above 300° C., for example 350° C., without undergoing marked changes in optical properties or mechanical properties during processing.

Three-dimensionally shaped or else sheetlike substrate layers b are produced proceeding from the described polymer composition containing the abovementioned components by commonly used incorporation methods by combining, mixing and homogenizing, and homogenizing in particular preferably takes place in the melt under the action of shear forces. To this end, the aromatic polycarbonate and any further components of the polycarbonate molding compound are mixed, extruded and pelletized in the melt under customary conditions in customary melt mixing assemblies, for example in single-screw or multi-screw extruders or in kneaders. The additives may be metered in either separately as granules/pellets via metering balances or side feed devices or else metered in at a suitable location into the solids conveying region of the extruder or into the polymer melt at elevated temperature as a melt by means of metering pumps. The masterbatches in the form of granules or pellets may also be combined with other particulate compounds to afford a premixture and then supplied together into the solids conveying region of the extruder or into the polymer melt in the extruder via metering hoppers or side feed devices. The compounding assembly is preferably a twin-screw extruder, particularly preferably a twin-screw extruder having corotating screws, wherein the twin-screw extruder preferably has a screw length/diameter ratio of 20 to 44, particularly preferably of 28 to 40. Such a twin-screw extruder comprises a melting zone and a mixing zone or a combined melting and mixing zone and optionally a degassing zone where an absolute pressure p of preferably not more than 800 mbar, more preferably not more than 500 mbar, particularly preferably not more than 200 mbar, is established. The average residence time of the mixture composition in the extruder is preferably limited to not more than 120 seconds, more preferably not more than 80 seconds, more preferably not more than 60 seconds. In a preferred embodiment, the temperature of the melt of the polymer/polymer alloy at the extruder outlet is 200° C. to 400° C.

In addition to extrusion, the compositions used for substrate layer b may be converted to substrate layer b by hot compression molding, spinning, blow-molding, thermoforming or injection molding. Preference is given here to injection molding or injection-compression molding.

Injection molding processes are well known to those skilled in the art and are described, for example, in "Handbuch Spritzgießen" [Injection Molding Handbook], Friedrich Johannnaber/Walter Michaeli, Munich; Vienna: Hanser, 2001, ISBN 3-446-15632-1 or "Anleitung zum Bau von Spritzgießwerkzeugen" [Introduction to the Construction of Injection Molds], Menges/Michaeli/Mohren, Munich; Vienna: Hanser, 1999, ISBN 3-446-21258-2.

Injection molding here encompasses all injection molding processes including multicomponent injection molding and injection-compression molding processes.

Injection-compression molding processes differ from conventional injection molding processes in that the injection and/or solidification procedure involves mold plate movement. In the known injection-compression molding process, the mold plates are already opened slightly before the injection procedure to compensate for the shrinkage occurring during subsequent solidification and to reduce the required injection pressure. A pre-enlarged cavity is therefore already present at the beginning of the injection procedure. Flash faces of the mold ensure that the pre-enlarged cavity is still sufficiently leaktight even when the mold plates have been opened a little. The plastics material is injected into this pre-enlarged cavity and is simultaneously/subsequently compressed as the mold moves towards the closed position. Particularly in the production of high-surface area and thin-walled moldings having long flow paths, the more complex injection-compression molding technique is preferred or in some cases essential. Only in this way can reduction in the injection pressures required for large moldings be achieved. Furthermore, stresses/warpage in the injection-molded part that result from high injection pressures can be avoided by injection-compression molding. This is important particularly in the production of optical plastics applications, for example glazing (windows) in motor vehicles, since optical plastics applications can easily be affected by stresses in the part which can impair the optical and mechanical properties.

Layer c

Suitable thermoplastics for optional layer c are preferably aromatic polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), aliphatic polyolefins such as polypropylene or polyethylene, cyclic polyolefin, poly- or copolyacrylates or poly- or copolymethacrylate, for example poly- or copolymethylmethacrylates (such as PMMA), and also copolymers with styrene, for example transparent polystyrene-acrylonitrile (PSAN), thermoplastic polyurethanes, polymers based on cyclic olefins (for example TOPAS®, a product commercially available from Ticona), polycarbonate blends with olefinic copolymers or graft polymers, for example styrene/acrylonitrile copolymers.

Particularly preferred are PMMA, PET, PEN, PETG, polycarbonate, copolycarbonate or polyester carbonate. PMMA, PET or PEN is very particularly preferred. The abovementioned polymers may be used alone or in mixtures.

Layer c has a thickness of up to 600 µm, preferably up to 500 µm, more preferably up to 200 µm. Layer c may also be a sequence of two or more layers, wherein the total thickness thereof does not exceed the recited limits.

Preferred film thicknesses of thermoplastic layer c are 10 µm to 500 µm. Particularly preferred film thicknesses are 20 µm to 250 µm. Films having a thickness of 25 µm to 150 µm are very particularly preferred as a carrier material.

Layer c may be applied to layer b by processes known to those skilled in the art. In particular, multicomponent injection molding or adhesive bonding are suitable.

However, particular preference is given to applying layer c together with metal layer d to substrate layer b. The combination of metal layer d and layer c is preferably a metal layer d that has been applied to a layer c of thermoplastic material as carrier material, especially as carrier film, especially based on a polyester, most preferably based on polyethylene terephthalate. It is also possible for one or more layers of (semi)metal oxide and/or nitrides to have been applied to one or both sides of metal layer d.

Metal Layer d

Metal layer d is disposed on the side of substrate layer b destined to be on the opposite side from the side facing toward the radiation source. In a roof module, for instance, this is the underside, the side to face the interior of the vehicle.

As well as an advantageous effect on heat management, the positioning of the metal layer on the side of the substrate layer b facing away from the heat source, especially the sun, has the advantage that the metal layer is protected from weathering effects. The multilayer article also does not have any disruptive metallic impression by virtue of this arrangement.

In the simplest case, the metal layer has a fully reflective configuration analogously to a mirror layer. As well as the relevant vacuum methods for application of the metal layers, especially sputtering methods, other conceivable methods are those of galvanization and wet-chemical deposition.

The processes are described in detail, for example, in "Vakuumbeschichtung Bd.1 bis 5" [Vacuum Coating Vol. 1 to 5], H. Frey, VDI-Verlag Düsseldorf 1995 or "Oberflächen-und Dünnschicht-Technologie" [Surface and Thin-Film Technology] Part 1, R. A. Haefer, Springer Verlag 1987.

In order to achieve better metal adhesion and in order to clean the substrate surface, the surface to be coated is normally subjected to a plasma pretreatment. A plasma pretreatment can under some circumstances change the surface properties of polymers. These methods are described, for example, in Friedrich et al. in "Metallized plastics 5&6: Fundamental and applied aspects" and in H. Grünwald et al. "Surface and Coatings Technology 111 (1999) 287-296".

The metal layer preferably contains at least one element selected from Ag, Al, Au, Pt, Fe, Cr, Sn, In, Ti, Pd, Nb, Cu, V, stainless steel alloys thereof. The layer is preferably a silver, gold, palladium or copper layer, most preferably a silver layer. The metal layer has preferably been encased on one or both sides by one or more (semi)metal oxide or (semi)metal nitride layers. Suitable oxides and/or nitride are especially aluminum oxide, titanium dioxide, silicon oxide $SiO_x$, tantalum pentoxide $Ta_2O_5$, zirconium oxide, zirconium dioxide, niobium oxide, hafnium oxide, tin oxide, zinc tin oxide, indium tin oxide, aluminum zinc oxide, silicon nitride, boron nitride or titanium nitride. However, these layers do not form part of the metal layer, but are arranged between layers c and d or else on the underside, i.e. the side remote from the radiation source, of the metal layer d and of the multilayer article. In addition, the above-described layer system consisting of metal layer and surrounding oxide layers may occur in multiply stacked form. The metal layer d may also be in direct contact with very thin optically inactive mixed oxide layers, e.g. NiO, NiCrO.

A metal layer d suitable in accordance with the invention, in one embodiment, is composed of a metal layer, especially a metal layer of silver or aluminum, optionally arranged in two coatings of a dielectric material such as metal oxide or metal nitride. Such a construction is generally produced by a sequence of deposition operations that are implemented by a vacuum method, such as optionally magnetic field-assisted cathode atomization or vapor deposition methods. It is also possible to apply to very fine metal layers on either side of the silver layer, the lower layer as bonding or nucleation layer and the outer layer as sacrificial layer in order to prevent the oxidation of the silver, when the dielectric layer that goes atop it consists of an oxide which is applied by reactive cathode atomization or reactive vapor deposition in the presence of oxygen.

One example of a corresponding sequence of metals or alloys and/or oxides on the substrate layer is substrate/tin oxide/NiCr/silver/NiCr/tin oxide.

A further example is substrate/tin oxide/silver/copper/tin oxide.

A further layer sequence is "substrate/tin oxide/zinc oxide/titanium oxide/(indium tin oxide or bismuth oxide)/(silver or a silver alloy containing 5% to 10% by weight of copper and/or titanium or stainless steel (e.g. 316))/tin oxide/zinc oxide/titanium oxide/indium tin oxide or bismuth oxide".

A further layer sequence is substrate/zinc oxide/niobium/silver/niobium/zinc oxide/silicon nitride or are further combinations of this sequence.

A layer sequence of the invention commences with the substrate, followed by a 20 nm- to 50 nm-thick dielectric layer such as titanium oxide, tin oxide, $Si_3N_4$ or zinc oxide (sputtering layer). The refractive index is preferably 2.0 to 2.5. The third layer is a thin barrier layer (0.5-1.5 nm) or bonding layer/joining layer of a nickel-chromium alloy, nickel chromium nitride (NiCrNx) or titanium. In some applications, this layer is also omitted. A fourth layer especially consists of a silver layer having a thickness of about 6 to 20 nm, which is transparent. The fifth layer is a protective or sacrificial layer of nickel-chromium alloy, NiCrNx, or titanium. The titanium layer may optionally have been oxidized. A sixth layer, a protective or passivating layer, typically consists of silicon nitride ($Si_3N_4$), tin oxide or titanium oxide, especially in thickness 25 to 45 nm. All thin layers are applied by a sputtering methodology or reactive sputtering.

If a metal oxide layer or metal nitride layer forms the outer layer of the multilayer article, the multilayer article preferably does not comprise any protective layer e since the metal oxide layer itself acts as sacrificial layer.

The metal layer may be introduced into further protecting, conserving or sacrificial layers. The metal layer itself may be present, for example, on a polymeric carrier such as a polyethylene terephthalate (layer c).

Various modifications may be undertaken on the above-mentioned layer structure. For example, two layers of silver may be used or different layer thicknesses may be used.

In one embodiment, metal layers are used without further passivation layers or protective layers. Preference is given here particularly to precious metals, e.g. gold.

The sum total of the thicknesses of all metal layers that form metal layer d is 1 to 30 nm, preferably 5 to 25 nm, further preferably 5-20 mm, more preferably to 15 nm. These thickness figures are each applicable to the respectively thickest site in layer d).

Layer d wholly or partly covers substrate layer b, optionally with the additional layer c. If layer d only partly covers substrate layer b, at least 60%, preferably at least 70%, further preferably at least 80%, more preferably at least 90%, of substrate layer b is covered by metal layer d. Regions of glazing, especially roof modules or tailgate glazing, that are covered at a later stage in the bodywork by frame components, especially of metal, through which no insolation can get into the vehicle interior fundamentally do not require a metal layer as part of the multilayer article.

The thickness of any further auxiliary, passivation or protection layers present totals 0.5 to 250 nm, preferably to 100 nm, further preferably to 80 nm.

Protective Layer e

Protective layer e, which may be composed of one or more layers e', e" etc. and is on the opposite side of the multilayer article from the side on which the radiation source lies, means protective layers that protect the metal layer or metal-like layers beneath from external influences, i.e. protects them from corrosion or else from other external influences such as detergents, scratches etc., and are not a metal oxide or metal nitride layer. Such protective layers may be applied in a PECVD (plasma-enhanced chemical vapor deposition) process or plasma polymerization process. In this case, low-boiling precursors, mainly siloxane-based precursors, are evaporated into a plasma and hence activated such that they can form a film. Typical substances here are hexamethyldisiloxane (HMDSO), tetramethyldisiloxane, decamethylcyclopentasiloxane, octamethylcyclotetrasiloxane and trimethoxymethylsilane, particular preference being given to hexamethyldisiloxane.

Most preferably, layer e is a layer containing hexamethyldisiloxane (HMDSO).

The total thickness of protective layer e is not more than 100 nm, further preferably less than 100 nm and more preferably less than 50 nm, most preferably less than 35 nm.

In one embodiment, the protective layer e may be formed from a conductive layer, for example from an ITO-containing layer. Especially preferably, the layer contains more than 50% by weight of ITO. Further useful conductive layers are those of zinc sulfide, silver chloride, zinc selenide and cadmium telluride. In this particular embodiment, the layer thickness may be up to 5 μm.

Preferably, the metal layer, for protection from oxidation or protection from other damage, is provided with one or more further layers e', e" etc. that form the protective layer e.

Preferably, layer e, or metal layer d when no protective layer e is present, which is a preferred embodiment in the case of metal layers of gold and/or platinum, is not followed by any further layer. Most preferably, the multilayer article of the invention does not comprise any layers apart from layers a, b, optionally c, d, optionally c and any adhesive layers present and any (semi)metal oxide/(semi)metal nitride layers present.

For the adhesive layers, for instance for joining of layers b and c, adhesives used are preferably what are called PSAs, pressure-sensitive adhesives. PSAs are understood to mean adhesives that are permanently tacky even at room temperature and have innate adhesion to other surfaces. This adhesion already occurs on exertion of a gentle pressure, as can be exerted by the force of a finger, for example.

Compound classes for PSAs are, for example, acrylates, polyurethanes, polyalphaolefins, silicones or tackified natural or synthetic rubber.

In addition, it is possible to use tackified OTP as adhesive, as described in U.S. Pat. No. 7,371,464 B2 (Sherman et al.).

Further preferred adhesives are "non-silicone-based pressure-sensitive adhesives", which are described inter alia in WO 2009/085662 A2 entitled "Urea-Based Pressure Sensitive Adhesives" and in US 2012/0100326 A1 entitled "Urethane-Based Pressure Sensitive Adhesives".

In the context of the invention, preference is given to adhesives from the class of the visually clear pressure-sensitive acrylic adhesives. Commercially available acrylic adhesives are Laminating Adhesive 8141 or Laminating Adhesive 8171, 8172 and 8173D from 3M.

The adhesive composition may, for example, be a pressure-sensitive adhesive, a heat-curing adhesive, a hotmelt adhesive or a combination of these.

As well as the layers described, the multilayer article of the invention may optionally comprise one or more further functional, joining or protective layers that do not contain any metal.

More particularly, the multilayer article of the invention may have a black edge. A black edge is a nontransparent layer, preferably made of a polymer blend, more preferably made of a polycarbonate blend, especially comprising polycarbonate as the component predominantly present. Such a nontransparent layer is in direct contact with the above-described layer construction comprising layers a to e over broad areas. The black edge is either outside layer sequence a to e or between layers a and b or d and e.

Preferably, this nontransparent material wholly or partly encompasses/frames substrate layer b or further layers joined directly or indirectly thereto or alternatively the entire multilayer construction in the edge regions. When the nontransparent material is matched to the shape, the transition of the materials is preferably in edge regions, such that any unevenness that occurs is concealed. In every case there are regions in which substrate layer b lies atop the nontransparent layer, or the nontransparent layer atop substrate layer b. What is meant here by "lies atop" is overlapping of the layers when looking at the multilayer article at right angles to the joining surface of the individual layers. It will be apparent that the nontransparent layer may, but need not, be in direct contact with the substrate layer b, since it may be arranged behind further layers, for instance layer c.

These nontransparent materials serve to form black edges or reinforcing frame elements. Another option as material for the production of black edges or reinforcing frame elements is the use of thermoplastics comprising fillers or reinforcers, especially the use of polymer blends modified in this way. In this connection, preference is given to blends comprising polycarbonate and at least one further thermoplastic.

The fillers and reinforcers used may be fibrous, lamellar, tubular, elongate or spherical, or particulate. Examples of fillers and reinforcers suitable in the context of the present invention include talc, wollastonite, mica, kaolin, kieselguhr, calcium sulfate, calcium carbonate, barium sulfate, glass fibers, glass spheres, ceramic spheres, hollow glass spheres, hollow ceramic spheres, glass wool, mineral wool, carbon fibers and carbon nanotubes. Preferred fillers are fillers which bring about isotropic shrinkage of the composition.

The use of talc and short glass fibers is particularly preferred in the context of the present invention.

Glass spheres or ceramic spheres, or hollow glass spheres or hollow ceramic spheres, can increase the scratch resistance of said surface.

In the compositions of the black edges, the content of fillers and reinforcers is 5% by weight to 40% by weight, preferably 7% by weight to 30% by weight, more preferably 8% by weight to 25% by weight, where the weight figures are based on the overall composition of the respective black edge.

If the metal layer d) is followed by further layers on the side remote from the radiation source, the maximum thickness of these is 100 nm, further preferably 30 nm, more preferably 20 nm.

EXAMPLES

There follows a detailed description of the invention with reference to working examples, where the methods of determination described here are employed for all corresponding parameters in the description of the present invention unless stated otherwise.

Substrate Layer b

Substrate 1: Polycarbonate from Covestro Deutschland AG having an MVR of about 12 $cm^3/(10\ min)$, measured at 300° C. and load 1.2 kg (to ISO 1133-1:2012-03) and based on bisphenol A and terminated by phenol. The material contains about 0.002% by weight of nanoscale carbon black and about 0.005% by weight of lanthanum hexaboride (calculated as solids content of lanthanum hexaboride). The transmittance data, measured on a 4 mm-thick sheet, are reported in table 1.

Substrate 2: Polycarbonate from Covestro Deutschland AG having an MVR of about 12 $cm^3/10\ min$, measured at 300° C. and load 1.2 kg (to ISO 1133-1:2012-03) and based on bisphenol A and terminated by phenol. The material contains neither nanoscale carbon black nor IR absorber. The transmittance data, measured on a 4 mm-thick sheet, are reported in table 1.

Substrate 3: Polycarbonate from Covestro Deutschland AG having an MVR of about 12 $cm^3/10\ min$, measured at 300° C. and load 1.2 kg (to ISO 1033) and based on bisphenol A and terminated by phenol. The material contained about 0.0011% by weight of nanoscale carbon black. The material did not contain any IR absorber. The transmittance data, measured on a 4 mm-thick sheet, are reported in table 1.

Substrate 4: Polycarbonate from Covestro Deutschland AG having an MVR of about 12 $cm^3/(10\ min)$, measured at 300° C. and load 1.2 kg (to ISO 1133-1:2012-03) and based on bisphenol A and terminated by phenol. The material contains about 0.0055% by weight of lanthanum hexaboride (calculated as solids content of lanthanum hexaboride). The transmittance data, measured on a 4 mm-thick sheet, are reported in table 1.

The substrates used for the examples were used in the form of 4 mm-thick injection-molded sheets.

Direct solar transmittance $T_{DS}$ was determined to ISO 13837:2008 at a layer thickness of 4 mm.

Light transmittance in the VIS region of the spectrum (380 to 780 nm, transmittance $T_{VIS}$) was determined to DIN ISO 13468-2:2006 (D65, 10°, layer thickness of specimen sheet: 4 mm).

The transmission measurements were performed using a Perkin Elmer Lambda 950 spectrophotometer with a photometer sphere. All values were determined in a measurement with wavelengths of 320 nm to 2500 nm inclusive with $\Delta\lambda=5$ nm.

TABLE 1

Transmission data for the substrate materials

| Substrate | Thickness | $T_{VIS}$ (D65, 10°) % | $T_{DS}$ % |
|---|---|---|---|
| 1 | 4 mm | 6.9 | 5.5 |
| 2 | 4 mm | 88.1 | 80.4 |
| 3 | 4 mm | 18.6 | 35.5 |
| 4 | 4 mm | 10.7 | 8.4 |

Layer Sequence F

Layer Sequence F1:

A metal-containing foil comprising a PET carrier film having a thickness of 50 μm and an alternating layer sequence of silver layers and indium oxide layers, where the total thickness of the alternating layer sequence was 150 nm, was used. The total thickness of the silver layers was 18 nm. A transparent PET film provided with an acrylate adhesive on both sides was stuck to the silver layer side of the metal-containing foil (9629 PC film from 3M; 41453 Neuss, Germany). In this way, the metal-containing foil was laminated by its metal layer onto the top side of the substrate. Thus, the alternating layer sequence of polycarbonate substrate and the PET substrate was enclosed.

Layer Sequence F2:

A metal-containing foil comprising a PET carrier film having a thickness of 50 μm and an alternating layer sequence of silver layers and indium oxide layers, where the total thickness of the alternating layer sequence was 150 nm, was used. The total thickness of the silver layers was 18 nm. A transparent PET film provided with an acrylate adhesive on both sides was stuck to the opposite side of the PET carrier film from the silver layer (9629 PC film from 3M; 41453 Neuss, Germany). In this way, the PET carrier film was laminated onto the top side of the substrate. Thus, the alternating layer sequence pointed upward and formed the first layer in the direction of the radiation source.

Layer Sequence F3:

A metal-containing foil comprising a PET carrier film having a thickness of 50 μm and an alternating layer sequence of silver layers and indium oxide layers, where the total thickness of the alternating layer sequence was 150 nm, was used. The total thickness of the silver layers was 18 nm. A transparent PET film provided with an acrylate adhesive on both sides was stuck to the silver layer side of the metal-containing foil (9629 PC film from 3M; 41453 Neuss, Germany). In this way, the metal-containing foil was laminated by its metal layer onto the bottom side of the substrate. Thus, alternating layer sequence of polycarbonate substrate and the PET layer was enclosed. The PET layer formed the lowermost layer.

Layer Sequence F4:

A metal-containing foil comprising a PET carrier film having a thickness of 50 μm and an alternating layer sequence of silver layers and indium oxide layers, where the total thickness of the alternating layer sequence was 150 nm, was used. The total thickness of the silver layers was 18 nm. A transparent PET film provided with an acrylate adhesive on both sides was stuck to the PET carrier film of the metal-containing foil (total thickness of the film 100 μm, 9629 PC film from 3M; 41453 Neuss, Germany). In this way, the PET carrier film of the metal-containing foil was laminated onto the bottom side of the substrate. Thus, the alternating layer sequence pointed downward and formed the last layer remote from the radiation source.

Layer Sequence F5:

A metal-coated foil from Bruxsafol with the Bruxsafol 70 trade name was used. The film comprised an about 110 μm-thick PET film. Atop the PET film there was an about 100 to 150 nm-thick gold-containing metal layer structure. In this case, the thickness of the gold layer was about 15-20 nm. This gold-containing layer was enclosed on both sides by an $SiO_2$— and indium oxide-containing layer. The construction was thus as follows: 15-20 nm $Si_3N_4$ layer; 5-10 nm $SiO_2$ layer, 30-40 nm ITO layer, 15-20 nm gold layer, 30-40 nm ITO layer, 20-30 nm $SiO_2$ layer. There then followed the PET carrier. The metal-containing foil was laminated onto the bottom side of the polycarbonate substrate by means of a transparent PET film that had been provided on both sides with an acrylate adhesive (total layer thickness of the film 100 μm; 9629 PC film from 3M; 41453 Neuss, Germany). The gold-containing metal construction was thus enclosed by the substrate and the PET carrier.

Layer Sequence F6:

A metal-coated foil from Bruxsafol with the Bruxsafol 70 trade name was used. The film comprised an about 110 μm-thick PET film. Atop the PET film there was an about 100 to 150 nm-thick gold-containing metal layer structure. In this case, the thickness of the gold layer was about 15-20 nm. This gold-containing layer was enclosed on both sides by an $SiO_2$— and indium oxide-containing layer. The construction was thus as follows: 15-20 nm $Si_3N_4$ layer; 5-10 nm $SiO_2$ layer, 30-40 nm ITO layer, 15-20 nm gold layer, 30-40 nm ITO layer, 20-30 nm $SiO_2$ layer. There then followed the PET carrier. The metal-containing foil was laminated onto the bottom side of the polycarbonate substrate by means of a transparent PET film that had been provided on both sides with an acrylate adhesive (9629 PC film from 3M; 41453 Neuss, Germany), with the gold-containing layer structure oriented as the last layer in the downward direction.

Test Setup:

The multilayer article was tested in a heat simulator (for test setup see FIG. 2). The heat simulator consisted of a metallic container with dimensions W×H×D of 220 mm×350 mm×120 mm. The walls were about 2 mm thick. The walls were covered with about 20 mm of black insulation on the inside. The base likewise consisted of a black insulation layer of thickness about 20 mm. Two thermocouples had been inserted into the interior. One thermocouple was about 70 mm above the upper edge of the container and was thus able to directly absorb the radiation coming through the multilayer article or from the multilayer article (T1). A second thermocouple beneath was covered with a metal plate and measured the temperature of the interior without being exposed directly to the radiation through the multilayer article (T2).

The respective multilayer article was placed onto the metal container and screwed down at the edges in order to prevent direct contact with the outside environment and hence convection effects from the environment. The surface temperature on the top side of the multilayer article was likewise measured (T3). Also measured was the ambient temperature (T4).

Above the multilayer article was disposed a quartz halogen lamp centered above the heat simulator with a power of 400 W at a distance of 430 mm from the surface of the multilayer article. In order to test the constancy of the irradiation, the irradiation intensity in the wavelength range of 380 to 780 nm was measured at the start and at the end of the testing (sensor: Gigahertz RW-3703-4). The irradiation intensity was between 10-12 mW/cm$^2$.

Test Method:

The temperatures of measurement points T1 and T2 for measurement of the temperature rise in the interior and T4 were measured continuously. After a testing period of about 2 h, no further changes were detectable in the temperature progressions. The measurement recorded was the temperatures after 4 h. The surface temperature was measured in each case at the end of the testing period by means of an IR thermometer.

Example 1

Comparative Example

The heat simulator box was covered with a 4 mm-thick injection-molded polycarbonate sheet of substrate 1.

Example 2

Comparative Example

The heat simulator box was covered with a 4 mm-thick injection-molded polycarbonate sheet of substrate 2.

Example 3

Comparative Example

The heat simulator box was covered with a multilayer article composed of a 4 mm-thick layer of injection-molded substrate 2 and a layer sequence in the form of F1. The metal-containing foil was thus applied to the top side of substrate 2. "Top side" (i.e. "top") here and hereinafter means the side facing toward the radiation source. The metal layer was thus laminated onto substrate 2 and hence enclosed between the carrier film of F1 and a layer of substrate 2.

Example 4

Comparative Example

The heat simulator box was covered with a multilayer article composed of a 4 mm-thick layer of substrate 1 and a layer sequence in the form of F1. The metal-containing foil was thus applied to the top side of substrate 1. The metal layer was thus laminated onto substrate 1 and hence enclosed between the carrier film of F1 and a layer of substrate 1.

Example 5

Comparative Example

The heat simulator box was covered with a multilayer article composed of a 4 mm-thick layer of substrate 1 and a layer sequence in the form of F2. The metal-containing foil was thus applied to the top side of substrate 1. The metal layer was thus the layer lying directly toward the radiation source of the multilayer article, while the PET carrier film formed the joining layer between metal layer and substrate layer.

Example 6

Comparative Example

The heat simulator box was covered with a multilayer article composed of a 4 mm-thick layer of substrate 2 and a layer sequence F3—i.e. metal-containing foil on the bottom side of substrate 2. The metal layer of layer F3 was arranged directly on the bottom side of substrate 2, while the PET carrier film formed the lower outer surface of the multilayer article.

Example 7

Comparative Example

The heat simulator box was covered with a multilayer article composed of a 4 mm-thick layer of substrate 1 and a layer sequence F3 on the bottom side of substrate 1, with the metal layer of layer sequence F3 as the closest layer to substrate 1.

Example 8

Comparative Example

The heat simulator box was covered with a multilayer article composed of a 4 mm-thick layer of substrate 3 and a layer sequence F4 on the bottom side of substrate 3. The PET layer of layer sequence F4 was enclosed by the layer of substrate 3 and the metal layer.

Example 9

Comparative Example

The heat simulator box was covered with a multilayer article composed of substrate 2 and a layer sequence F4 on the bottom side of substrate 2. The PET layer of layer sequence F4 was thus enclosed by the layer of substrate 2 and the metal layer.

Example 10

Comparative Example

The heat simulator box was covered with a multilayer article composed of a 4 mm-thick layer of substrate 1 and a layer sequence F4. The metal-containing foil was thus on the bottom side of substrate 1. The PET carrier film of F4 followed on from the layer of substrate 1, then came the metal foil, to which a further 4 mm-thick layer of polycarbonate had in turn been applied in the form of substrate 2. The metal layer was thus an inner layer of the multilayer article.

Example 11

Comparative Example

The heat simulator box was covered with a multilayer article composed of substrate 2 and a layer sequence F5. The metal layer was thus on the bottom side of substrate 2. The metal layer was enclosed here by substrate 2 and the PET carrier film.

Example 12

Comparative Example

The heat simulator box was covered with a multilayer article composed of a 4 mm-thick layer of substrate 1 and a layer sequence F5. The metal layer was thus on the bottom side of substrate 1. The metal layer was enclosed here by substrate 1 and the PET carrier film.

Example 13

Comparative Example

The heat simulator box was covered with a multilayer article composed of a 4 mm-thick layer of substrate 2 and a layer sequence F6.

Example 14

Comparative Example

The heat simulator box was covered with a multilayer article composed of 4 mm-thick layer of substrate 3 and a layer sequence F6. Thus, the metal layer formed the lowermost layer of the multilayer article.

Example 15

Inventive

The heat simulator box was covered with a multilayer article composed of a 4 mm-thick layer of substrate 1 and a layer sequence F4. The metal layer thus formed the lowermost layer of the multilayer article.

Example 16

Inventive

The heat simulator box was covered with a multilayer article composed of a 4 mm-thick layer of substrate 1 and a layer sequence F6. The metal layer thus formed the lowermost layer of the multilayer article.

Example 17

Inventive

The heat simulator box was covered with a multilayer article composed of a 4 mm-thick layer of substrate 1 and a layer sequence F4. The metal layer thus formed the lowermost layer of the multilayer article. Substrate layer 1 was provided with a protective layer (protective layer a) on the uncoated top side.

Substrate layer a was applied as follows:

The coating was conducted manually. This was done by pouring the liquid primer or lacquer solution to be coated, for formation of the protective layer, across the sheet proceeding from the upper edge of the small part in longitudinal direction, while the starting point of the lacquer on the sheet was simultaneously guided from left to right across the width of the sheet. After a flash-off time of 30 minutes at 23° C. and the painted sheets were then cured at 130° C. for 60 minutes while suspended vertically on a clip. After the applying of the primer layer, the topcoat or hard coat was applied in an analogous manner and, after a flash-off time of 30 minutes at 23° C., cured at 130° C. for 60 minutes.

Example 18

Inventive

Substrate 4

The heat simulator box was covered with a multilayer article composed of a 4 mm-thick layer of substrate 4 and a layer sequence F6.

TABLE 2

| | | T1 Inside sun | T2 Inside shade | T3 Surface | T4 Environment |
|---|---|---|---|---|---|
| 1 | comparative | 55° C. | 46° C. | 60° C. | 57° C. |
| 2 | comparative | 71° C. | 54° C. | 67° C. | 20° C. |
| 3 | comparative | 45° C. | 39° C. | 46° C. | 21° C. |
| 4 | comparative | 38° C. | 35° C. | 49° C. | 21° C. |
| 5 | comparative | 37° C. | 34° C. | 49° C. | 21° C. |
| 6 | comparative | 51° C. | 43° C. | 56° C. | 21° C. |
| 7 | comparative | 49° C. | 43° C. | 68° C. | 21° C. |
| 8 | comparative | 43° C. | 37° C. | 63° C. | 22° C. |
| 9 | comparative | 49° C. | 41° C. | 57° C. | 22° C. |
| 10 | comparative | 48° C. | 42° C. | 71° C. | 22° C. |
| 11 | comparative | 52° C. | 43° C. | 55° C. | 21° C. |
| 12 | comparative | 49° C. | 42° C. | 67° C. | 21° C. |
| 13 | comparative | 51° C. | 43° C. | 56° C. | 22° C. |
| 14 | comparative | 51° C. | 44° C. | 64° C. | 22° C. |
| 15 | inventive | 37° C. | 33° C. | 73° C. | 21° C. |
| 16 | inventive | 39° C. | 36° C. | 71° C. | 22° C. |
| 17 | inventive | 38° C. | 35° C. | 75° C. | 22° C. |
| 18 | inventive | 41° C. | 37° C. | 68° C. | 21° C. |

It is apparent from examples 3 to 5 that metal layers above the polycarbonate (i.e. facing toward the heat source) distinctly reduce the interior temperatures. The greatest effect is achieved here by the combination of IR-containing PC with a metal layer above. It is unimportant here whether the metal layer is exposed or facing the PC (comparative examples 4 and 5). However, these layer structures have a metallic impression perceptible from the outside, which was specifically to be avoided. Moreover, the metal layers are exposed to weathering.

It was surprising that a significant factor in the reverse sequence, i.e. when the metal layer is disposed behind the PC, is how the metal layer is arranged. It was also surprising that the use of IR absorbers is advantageous. Use of IR absorbers results in distinct heating of the multilayer article, which normally results in the heating of the interior after a certain period. Surprisingly, however, the inventive layer construction composed of specific polycarbonate and specifically arranged metal layers shows a distinctly lower interior temperatures—both directly beneath the multilayer article and in the "shade". By contrast, other constructions that likewise contain metal layers lead to much higher interior temperatures. Inventive example 17 also shows that protective layers atop the substrate layer surprisingly do not impair the effect of the invention. In this case too, low interior temperatures are measured. Normally, such siloxane layers, owing to lowering of the reflection, increase energy transmission and hence energy input into the interior. However, it was shown that this is not the case in the layer structure of the invention. Inventive example 18 shows that the presence of carbon black in addition to the IR absorber other than carbon black is not required.

Figure 1:
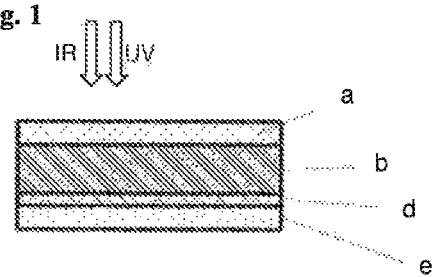
FIG. 1 shows a layer structure.
Figure 2:
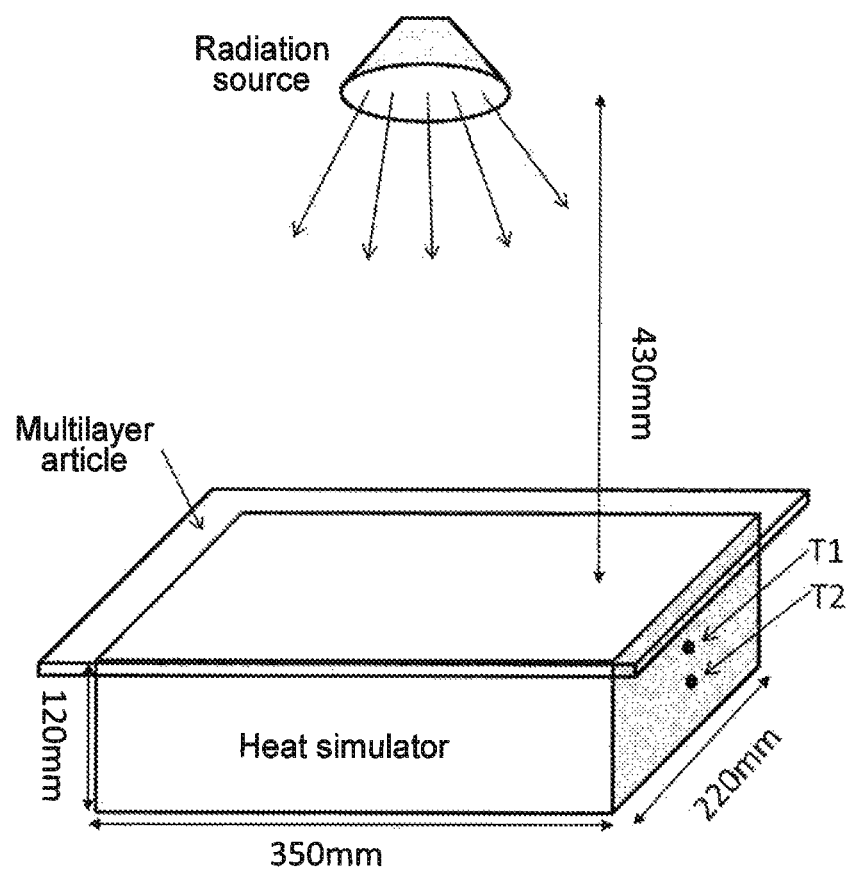
FIG. 2 shows an experimental setup.

The invention claimed is:

1. A transparent multilayer article suitable for shielding a three-dimensional volume from a radiation source, comprising, in this sequence,
   a) optionally a protective layer a,
   b) a substrate layer b based on a thermoplastic polymer having light transmittance in the range from 380 to 780 nm of at least 3.0% determined at a layer thickness of 4 mm according to DIN ISO 13468-2:2006 (D65, 10°) and
   a direct solar transmittance $T_{DS}$ value of less than 40%, determined according to ISO 13837:2008 at a layer thickness of 4 mm, where the substrate layer contains at least 0.001% by weight of an IR absorber other than carbon black,
   c) optionally a further layer c based on a thermoplastic polymer having a maximum thickness of 600 µm,
   d) at least one metal layer d comprising at least one element selected from Ag, Al, Au, Pt, Fe, Cr, Sn, In, Ti, Pd, Nb, Cu, V or alloys thereof where the sum total of the thicknesses of all metal layers is 1 nm to a maximum of 30 nm, and
   e) optionally a protective layer e,
      wherein at least 60% of the substrate layer b is covered by metal layer d,
      the layers that follow on from layer d, including protective layer e, have a total thickness of not more than 100 nm
      and the metal layer is disposed on the side of the substrate layer b intended to lie on the side of the multilayer article facing away from the radiation source.

2. The multilayer article as claimed in claim 1, wherein the $T_{DS}$ value of the substrate layer b is less than 30%, determined according to ISO 13837:2008 at a layer thickness of 4 mm.

3. The multilayer article as claimed in claim 1, wherein the IR absorber is selected from borides and/or tungstates.

4. The multilayer article as claimed in claim 1, wherein the substrate layer b contains 0.003% to 0.009% by weight of IR absorbers other than carbon black.

5. The multilayer article as claimed in claim 1, wherein the substrate layer b contains 0.004% to 0.008% by weight of lanthanum hexaboride as IR absorber.

6. The multilayer article as claimed in claim 1, wherein the thermoplastic polymer in the substrate layer b is aromatic polycarbonate.

7. The multilayer article as claimed in claim 1, wherein the substrate layer contains up to 0.003% by weight of carbon black.

8. The multilayer article as claimed in claim 1, wherein the multilayer article has a three-dimensionally shaped surface.

9. The multilayer article as claimed in claim 1, wherein the multilayer article, apart from adhesive layers including any carrier films, does not comprise any further layers between layers b to d for bonding of the individual layers and/or any (semi)metal nitride layers and/or (semi)metal oxide layers.

10. The multilayer article as claimed in claim 1, wherein the three-dimensional volume to be shielded is a motor vehicle interior, the multilayer article is a bodywork part or part of a bodywork part and the radiation source is the sun.

11. The multilayer article as claimed in claim 1, wherein the multilayer article comprises the following layers:
    Layer a) a scratch-resistant coating based on polysiloxane, and optionally a primer layer which is disposed atop the substrate layer b and acts as an adhesion promoter between the scratch-resistant coating based on polysiloxane and the substrate layer b, and
    Layer b) a substrate layer b based on aromatic polycarbonate, having light transmittance in the range from 380 to 780 nm of at least 3.0% determined at a layer thickness of 4 mm according to DIN ISO 13468-2:2006 (D65, 10°) and
    a $T_{DS}$ value of less than 40%, determined according to ISO 13837:2008 at a layer thickness of 4 mm,
    where the substrate layer contains at least 0.001% by weight of an IR absorber other than carbon black, and
    Layer d') at least one metal layer d comprising at least one element selected from Ag, Al, Au, Cu or alloys thereof where the sum total of the thicknesses of all metal layers is 5 nm to 20 nm, or
    Layer d") a metal layer system consisting of
       i) one or more metal layers, selected from the group of the Ag, Au and Cu layers and mixtures thereof, where the sum total of the thicknesses of the metal layers is 5 to 20 nm, and
       ii) optically active antireflection layers of metal oxide applied to either side of the metal layer(s), the thickness of each of which is 5 to 80 nm.

12. The multilayer article as claimed in claim 11, wherein the multilayer article comprises an adhesive layer between layer b and layer d'/d" and
    Layer c) a layer c based on a thermoplastic polymer, having a maximum thickness of 600 µm.

13. The multilayer article as claimed in claim 11, wherein the multilayer article does not comprise any further layers.

14. A glazing or a glazing element comprising a multilayer article as claimed in claim 1.

15. The glazing as claimed in claim 14, wherein the glazing is a roof module having a black edge alongside the multilayer article.

* * * * *